US011295724B2

(12) United States Patent
Chen et al.

(10) Patent No.: US 11,295,724 B2
(45) Date of Patent: Apr. 5, 2022

(54) SOUND-COLLECTING METHOD, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Changbin Chen, Beijing (CN); Yanyao Bian, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 138 days.

(21) Appl. No.: 16/655,671

(22) Filed: Oct. 17, 2019

(65) Prior Publication Data

US 2020/0394995 A1 Dec. 17, 2020

(30) Foreign Application Priority Data

Jun. 17, 2019 (CN) ........................ 201910521230.5

(51) Int. Cl.
*G10L 15/22* (2006.01)
*G10L 15/26* (2006.01)
(Continued)

(52) U.S. Cl.
CPC .......... *G10L 13/047* (2013.01); *G10L 13/033* (2013.01); *G10L 21/0232* (2013.01)

(58) Field of Classification Search
CPC ........... G09B 5/00; G09B 19/06; G10L 15/22; G10L 15/26
See application file for complete search history.

(56) References Cited

U.S. PATENT DOCUMENTS 5,957,693 A * 9/1999 Panec ...................... B42D 1/00 434/178
6,879,967 B1 4/2005 Stork
(Continued)

FOREIGN PATENT DOCUMENTS

CN 1379391 A 11/2002
CN 102117614 A 7/2011
(Continued)

OTHER PUBLICATIONS

Chinese Office Action dated May 8, 2020, for related Chinese Appln. No. 201910521230.5; 7 Pages.
(Continued)

*Primary Examiner* — Shreyans A Patel
(74) *Attorney, Agent, or Firm* — Brooks Kushman P.C.

(57) ABSTRACT

The present disclosure provides a sound-collecting method, apparatus, device and computer storage medium, wherein the method comprises: a sound-collecting apparatus collecting first sound data while playing a preset speech section; collecting sound data of a user following and reading the speech section; subjecting the sound data of following and reading the speech section to interference removal processing by using a sound interference coefficient to obtain second sound data, wherein the sound interference coefficient is determined with the speech section and the first sound data; obtaining training data for speech synthesis by using the second sound data. The quality of the collected sound data can be improved in a manner provided by the present disclosure.

10 Claims, 6 Drawing Sheets

(51) Int. Cl.

| | |
|---|---|
| ***G10L 13/047*** | (2013.01) |
| ***G10L 13/033*** | (2013.01) |
| ***G10L 21/0232*** | (2013.01) |

(56) References Cited

U.S. PATENT DOCUMENTS

| | | | | |
|---|---|---|---|---|
| 2006/0194181 | A1* | 8/2006 | Rosenberg | G09B 19/06 434/317 |
| 2008/0243510 | A1* | 10/2008 | Smith | G10L 13/00 704/259 |
| 2020/0159767 | A1* | 5/2020 | Durairaj | G09B 7/02 |
| 2020/0320898 | A1* | 10/2020 | Johnson | G10L 15/08 |

FOREIGN PATENT DOCUMENTS

| | | | |
|---|---|---|---|
| CN | 103065620 | A | 4/2013 |
| CN | 103277874 | A | 9/2013 |
| CN | 104079306 | A | 10/2014 |
| CN | 105304081 | A | 2/2016 |
| CN | 107293284 | A | 10/2017 |
| CN | 107507620 | A | 12/2017 |
| CN | 108320732 | A | 7/2018 |
| CN | 108550371 | A | 9/2018 |

OTHER PUBLICATIONS

Chinese Search Report dated Apr. 30, 2020 for related Chinese Appln. No. 201910521230.5; 3 Pages.

Chinese Notice of Allowance dated Jul. 22, 2020 for related Chinese Appln. No. 201910521230.5; 1 Page.

* cited by examiner

FIG. 3
Record
Play
Start Recording
Follow and Read
Summer is leaving, autumn is coming.
Play
Return

SOUND-COLLECTING METHOD, DEVICE AND COMPUTER STORAGE MEDIUM

CROSS REFERENCE TO RELATED APPLICATION

This application claims the priority of Chinese Patent Application No. 201910521230.5, filed on Jun. 17, 2019, with the title of "Sound-collecting method, apparatus, device and computer storage medium," which is incorporated herein by reference in its entirety.

FIELD OF THE DISCLOSURE

The present disclosure relates to the technical field of computer application, and particularly to a sound-collecting method, device and computer storage medium.

BACKGROUND OF THE DISCLOSURE

This portion intends to provide a background or context for implementations of the present disclosure stated in claims. The depictions here should not be considered as being prior art as being included in this portion.

As artificial intelligence technology develops rapidly, more and more smart devices having a speech interaction function such as smart speakers, smart TV sets and smart remote controllers come into existence. As users' personalized demands increase, many users hope to use a familiar or favorite sound on a smart device for interaction. For example, the user hopes that when speech interaction is performed with a smart speaker, the smart speaker uses his own kid's voice or his own voice. To this end, it is necessary that use the smart device to collect voice data in advance, and then use the collected voice data to perform model training to synthesize a personalized voice.

A conventional voice-collecting manner is that a text to be read by a user is displayed on a screen of the smart device, the user, after clicking a sound-recording button, reads the text on the screen word by word, and the smart device records the user's reading voice data and uploads the data to a server. However, the conventional voice-collecting manner is not applicable for a user having a reading difficulty such as illiteracy. Furthermore, voice data collected from users who have different reading habits and read the same passage deviate greatly in terms of reading rhythm, emotion and speed, and cause difficulty in subsequent model training. In addition, to ensure clear viewing of words on the screen, the user needs to keep a certain distance from the terminal, which causes the collected voice to include interference from for example large noise and reverberation in the absence of a voice-gathering device. Therefore, the voice data collected in the conventional voice-collecting manner is of lower quality.

SUMMARY OF THE DISCLOSURE

In view of the above, the present disclosure provides a sound-collecting method, apparatus, device and computer storage medium, to help improve the quality of the collected sound data.

Specific technical solutions are as follows:

In a first aspect, the present disclosure provides a sound-collecting method, the method comprising:

a sound-collecting apparatus collecting first sound data while playing a preset speech section;

collecting sound data of a user following and reading the speech section;

subjecting the sound data of following and reading the speech section to interference removal processing by using a sound interference coefficient to obtain second sound data, wherein the sound interference coefficient is determined with the speech section and the first sound data;

obtaining training data for speech synthesis by using the second sound data.

According to a preferred embodiment of the present disclosure, the sound-collecting apparatus playing a preset speech section comprises:

after a sound collection function is activated, the sound-collecting apparatus automatically plays the preset speech section; or after the sound collection function is activated, the sound-collecting apparatus plays the preset speech section when the user's operation of triggering the play is received.

According to a preferred embodiment of the present disclosure, while the sound-collecting apparatus playing a preset speech section, the method further comprises:

displaying words corresponding to the speech section on a device having a screen and connected to the sound-collecting apparatus.

According to a preferred embodiment of the present disclosure, before the collecting the sound data of the user following and reading the speech section, the method further comprises:

the sound-collecting apparatus guiding the user to follow and read the speech section through a prompt tone; or guiding the user to follow and read the speech section by displaying a prompt message or prompt picture on the device having a screen and connected to the sound-collecting apparatus.

According to a preferred embodiment of the present disclosure, before guiding the user to follow and read the speech section, the method further comprises:

using the sound interference coefficient to judge whether a current collection environment meets a preset requirement, and if yes, continuing to guide the user to follow and read the speech section; otherwise, prompting the user to change the collection environment.

According to a preferred embodiment of the present disclosure, the determining the sound interference coefficient with the speech section and the first sound data comprises:

taking the speech section as a reference speech, performing noise and reverberation estimation on the first sound data, and obtaining a noise figure and a reverberation delay coefficient of the first sound data;

the subjecting the sound data of following and reading the speech section to interference removal processing by using a sound interference coefficient comprises:

using the noise figure and the reverberation delay coefficient to perform noise suppression and reverberation adjustment on the sound data of following and reading the speech section.

According to a preferred embodiment of the present disclosure, the obtaining training data for speech synthesis by using the second sound data comprises:

the sound-collecting apparatus uploading the second sound data to a server as training data for speech synthesis; or the sound-collecting apparatus performing quality scoring on the second sound data, and when a quality scoring result satisfies a preset requirement, uploading the second sound data to the server as training data for speech synthesis.

According to a preferred embodiment of the present disclosure, when the quality scoring result of the second sound data does not meet the preset requirement, playing the same preset speech section to perform sound collection again; when the quality scoring result of the second sound data satisfies the preset requirement, playing next preset speech section to continue to perform the sound collection.

In a second aspect, the present disclosure provides a sound-collecting apparatus, the apparatus comprising:

a playing unit configured to play a preset speech section;

a collecting unit configured to collect first sound data while playing the preset speech section; and collect sound data of a user following and reading the speech section;

an interference removing unit configured to determine a sound interference coefficient with the speech section and the first sound data; and perform interference removal processing on the sound data of following and reading the speech section with the sound interference coefficient, to obtain second sound data;

a determining unit configured to obtain training data for speech synthesis by using the second sound data.

According to a preferred embodiment of the present disclosure, the apparatus further comprises:

a prompting unit configured to guide the user to follow and read the speech section through a prompt tone before the collecting unit collects the sound data of the user following and reading the speech section; or guide the user to follow and read the speech section by displaying a prompt message or prompt picture on a device having a screen and connected to the sound-collecting apparatus.

According to a preferred embodiment of the present disclosure, before guiding the user to follow and read the speech section, the prompting unit is further configured to use the sound interference coefficient to judge whether a current collection environment meets a preset requirement, and if yes, continue to guide the user to follow and read the speech section; otherwise, prompt the user to change the collection environment.

According to a preferred embodiment of the present disclosure, the interference removing unit specifically performs:

taking the speech section as a reference speech, performing noise and reverberation estimation on the first sound data, and obtaining a noise figure and a reverberation delay coefficient of the first sound data;

using the noise figure and the reverberation delay coefficient to perform noise suppression and reverberation adjustment on the sound data of following and reading the speech section, to obtain the second sound data.

According to a preferred embodiment of the present disclosure, the determining unit is specifically configured to:

upload the second sound data to a server as training data for speech synthesis; or perform quality scoring on the second sound data, and when a quality scoring result satisfies a preset requirement, upload the second sound data to the server as training data for speech synthesis.

According to a preferred embodiment of the present disclosure, when the quality scoring result of the second sound data does not meet the preset requirement, the playing unit plays the same preset speech section to perform sound collection again; when the quality scoring result of the second sound data satisfies the preset requirement, the playing unit plays next preset speech section to continue to perform the sound collection.

In a third aspect, the present disclosure further provides a device, the device comprising:

one or more processors, a storage for storing one or more programs, the one or more programs, when executed by said one or more processors, enable said one or more processors to implement the above method.

In a fourth aspect, the present disclosure further provides a storage medium containing computer executable instructions which, when executed by a computer processor, perform the above method.

As can be seen from the above technical solutions, the method, apparatus, device and computer storage medium according to the present disclosure have the following advantages:

1) The present disclosure realizes the collection of sound data in a way that the speech section is played and then the user follows and reads the speech section, and is also applicable for a user having a reading difficulty such as illiteracy.

2) In the follow-read mode, the user is usually inclined to employ the rhythm, emotion and speed mode employed by the speech section, which is beneficial to control emotional prosody features that are difficult to describe in the language during the sound collection process, and is more conducive to subsequent training of a speech synthesis model.

3) Since the user does not need to gaze at the screen, the user may get closer to the sound pickup device during recording, so that even if there is no sound-gathering device, higher-quality sound data can be collected, and the requirement for collecting the sound data for speech syntheses can be satisfied easier.

4) In the manner provided by the present disclosure, the recording environment can be effectively perceived, and the perceived environment information can be used to determine the interference coefficient, thereby performing interference removal processing for the collected user's sound data, and thereby improving the quality of the collected sound data.

DETAILED DESCRIPTION

The present disclosure will be described in detail with reference to figures and specific embodiments to make objectives, technical solutions and advantages of the present disclosure more apparent.

Figure 1:
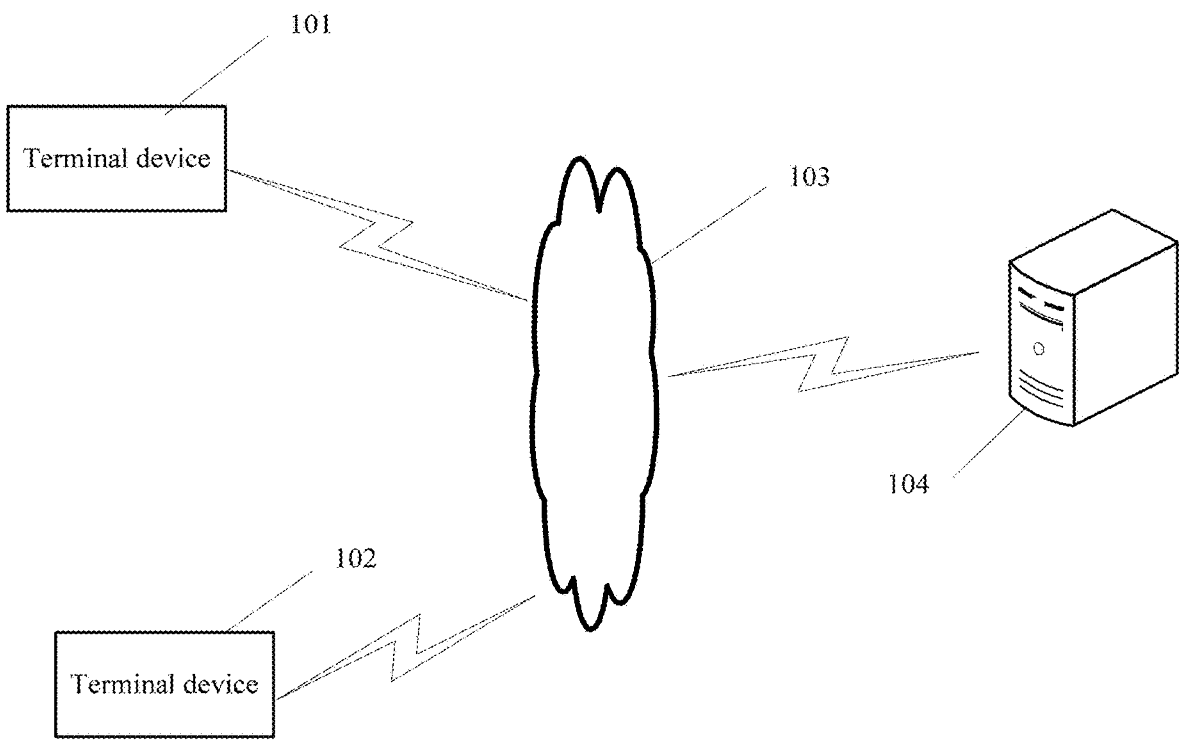
FIG. 1 is a schematic diagram of a system architecture to which an embodiment of the present disclosure may be applied.

FIG. 1 shows an example system architecture to which a sound-collecting method or a sound-collecting apparatus according to embodiments of the present disclosure is applied.

As shown in FIG. 1, the system architecture may include terminal devices 101 and 102, a network 103 and a server 104. The network 103 is used to provide a medium of a communication link between the terminal devices 101, 102 and the server 104. The network 103 may include various connection types, such as a wired communication link, a wireless communication link, a fiber optic cables, or the like.

The user may use the terminal devices 101 and 102 to interact with the server 104 over the network 103. Various applications such as a speech interaction application, a web browser application and a communication application may be installed on the terminal devices 101 and 102.

The terminal devices 101 and 102 may be various electronic devices that support the speech interaction, or may be devices with a screen or devices without a screen. The terminal devices 101 and 102 include but are not limited to smartphones, tablet computers, smart speakers and smart TV sets. The sound-collecting apparatus provided by the present disclosure may be disposed in and operate in the above terminal device 101 or 102. It may be implemented as a plurality of software or software modules (for example, to provide distributed services), or may also be implemented as a single software or software module, which is not specifically limited herein.

For example, the sound-collecting apparatus is disposed in and operates in the terminal device 101, the sound data collected by the sound-collecting apparatus in the present embodiment of the present disclosure may be used as training data for voice synthesis, and the synthesized voice may be used for the voice function of the terminal device 101 or for the voice function of the terminal device 102.

The server 104 may be a single server or a server group composed of a plurality of servers. The server 104 is configured to acquire sound data from the sound-collecting apparatus as the training data for voice synthesis, and set the voice function of the terminal device 101 or terminal device 102, so that when the terminal device 101 or terminal device 102 uses the synthesized voice upon performing speech interaction with the user or performing speech broadcast.

It should be understood that the number of terminal devices, network and server in FIG. 1 is merely illustrative. There may be any number of terminal devices, networks, and servers according to actual needs.

Figure 2:
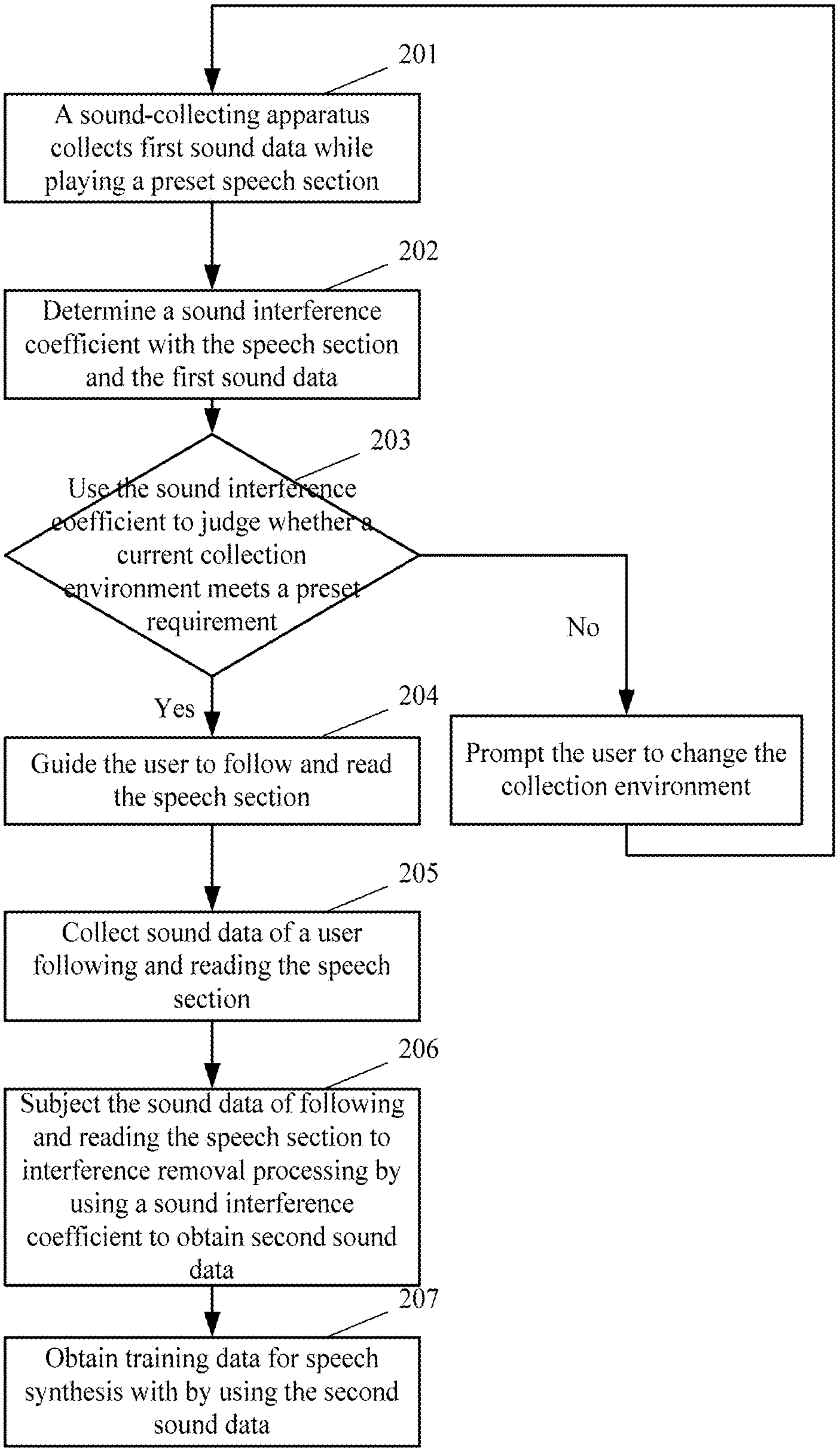
FIG. 2 is a flowchart of a method according to an embodiment of the present disclosure.

FIG. 2 is a flowchart of a method according to an embodiment of the present disclosure. The method is performed by the sound-collecting apparatus. The sound-collecting apparatus may be disposed in the terminal device 101 or 102 in FIG. 1. As shown in FIG. 2, the method may include the following steps:

At 201, the sound-collecting apparatus collects first sound data while playing a preset speech section.

After the sound collection function is activated, the sound-collecting apparatus automatically plays the preset speech section, or plays the preset speech section after receiving the user's operation of triggering the play.

For example, the sound-collecting apparatus is placed in a smart speaker, and the user may trigger the sound collection function by pressing a physical button on the smart speaker. Alternatively, the user may trigger the sound collection function of the smart speaker through a preset speech command.

For another example, the sound-collecting apparatus is disposed in a mobile phone, and the user's voice is collected through the mobile phone to achieve the synthesis of the voice used by the smart speaker. Then, the user may trigger the sound collection function by pressing a physical button on the mobile phone, or the user may trigger the sound collection function after entering a specific interface of a specific application on the mobile phone.

After the user triggers the sound collection function, the sound collection function is activated. The sound-collecting apparatus may automatically play a preset speech section, or may also play the preset speech section after receiving the user' operation of triggering the play. For example, the user may press a physical button on the smart speaker or mobile phone to trigger the playing operation according to a prompt tone. For another example, after the user enters a specific interface of a specific application on the mobile phone, for example, the interface shown in FIG. 3, he may click a "play" control to trigger the playing of the preset speech section.

In the embodiment of the present disclosure, the played speech section is preferably a short sentence which is easy to memorize and read, so as to facilitate users at different ages and knowledge levels to follow and read.

Figure 4:
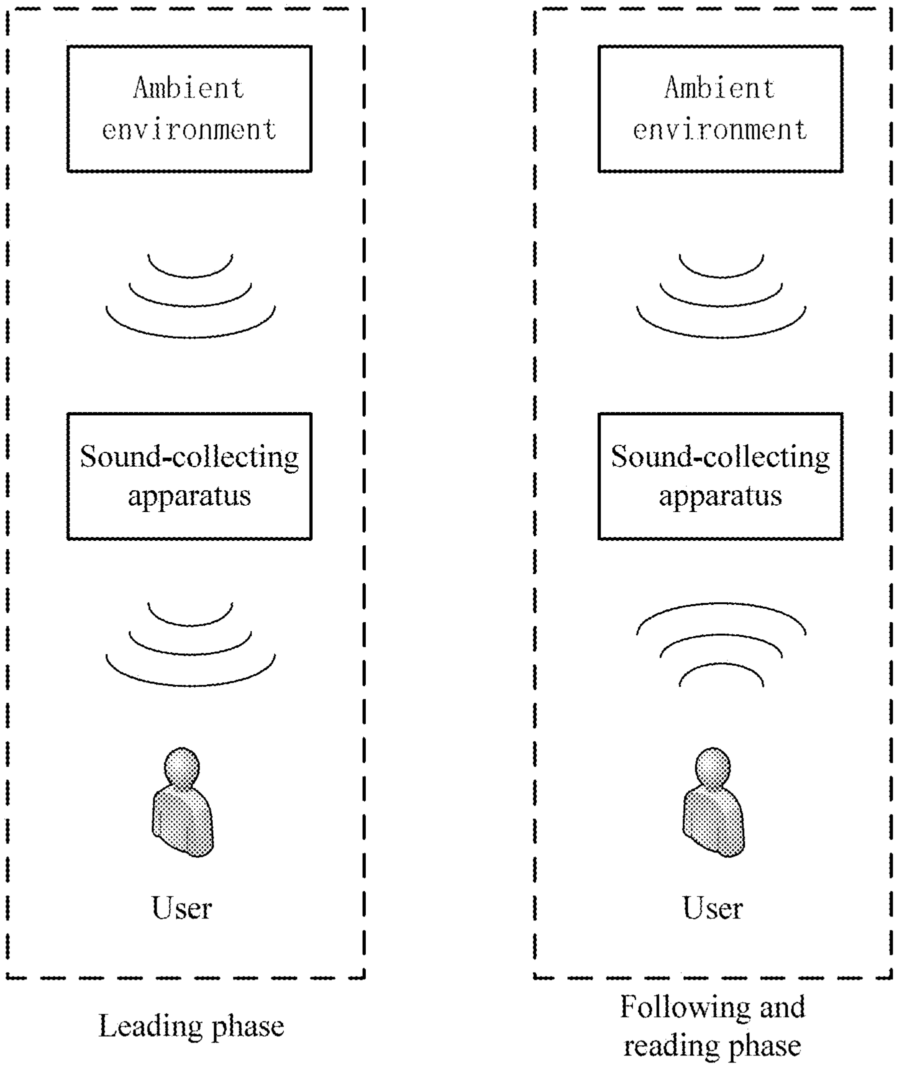
FIG. 4 is an operation schematic diagram in a leading phase and a following and leading phase according to an embodiment of the present disclosure.

This step is a leading phase (lead in reading phase) in the embodiment of the present disclosure. In the reading phase, the sound data is collected while the speech section is played, whereupon the collected sound data is referred to as first sound data (it needs to be appreciated that "first", "second" and so on involved in the embodiments of the present disclosure do not have a sense of sequence, size and so on, and are only intended to distinguish different objects of the same term). The phase may be as shown in FIG. 4. The sound-collecting apparatus includes a sound pickup device such as a microphone or a microphone array to realize the collection of sound data. The first sound data collected during the leading phase includes some noise of the ambient environment on the one hand, and also includes the signal of the played speech section reflected back by the environment on the other hand.

Figure 3:
FIG. 3 is a schematic diagram of an interface for sound collection according to an embodiment of the present disclosure.

In addition, when the speech section is played during the leading phase, words corresponding to the speech section may be displayed on a device having a screen and connected to the sound-collecting apparatus. For example, the sound-collecting apparatus is disposed in a smart speaker. If the smart speaker itself has a display screen, words corresponding to the speech section may be displayed on the display screen of the smart speaker for the user to view. If the smart speaker itself does not have a screen, the words corresponding to the speech section may be displayed through the screen of the mobile phone that is connected to the smart speaker. The smart speaker may be directly connected to the mobile phone, or connected to the mobile phone via other networks. Again for example, if the sound-collecting apparatus is disposed on the mobile phone, the words corresponding to the speech section may be directly displayed on the screen of the mobile phone. As shown in FIG. 3, a display interface of the mobile phone may display "Summer is going, and autumn is coming", so that the user looks up and reads the words in the case of not hearing the speech section clearly. That is to say, the sound-collecting apparatus may be internally or externally connected to the device having a screen.

At 202, a sound interference coefficient is determined with the speech section and the first sound data.

As known from the above, the first sound data collected during the leading phase includes some noise of the ambient environment on the one hand, and also includes a signal of the played speech section reflected back by the environment on the other hand. Therefore, in this step, the above-mentioned speech section may be used as a reference speech, and noise and reverberation estimation may be performed on the first sound data to obtain a noise figure and a reverberation delay coefficient of the first sound data.

When noise estimation is performed, the noise figure Xn may be estimated in real time by using, for example, MCRA (Minima-Controlled Recursive-Averaging Algorithms).

The reverberation delay (or referred to as reverberation time) is an index of the reverberation effect in the environment. When the reverberation delay coefficient is performed, the reverberation delay coefficient Xd may be obtained by iterative approximation using an equation such as the Sabine equation.

The above-mentioned MCRA, Sabine formula, etc. will not be described in detail any more since they are relatively mature noise and reverberation estimation methods.

At 203, the sound interference coefficient is used to judge whether the current collection environment meets a preset requirement. If yes, perform 204; otherwise, prompt the user to change the collection environment, and then turn to perform 201.

Specifically, it may be judged whether a value of the sound interference coefficient determined in step 202 meets a preset requirement, for example, judge whether the noise figure Xn is less than a preset noise figure threshold and whether the reverberation delay coefficient Xd is less than a preset reverberation delay coefficient threshold. If yes, it is determined that the current collection environment meets the preset requirement; otherwise, it is determined that the current collection environment does not meet the preset requirement. When the current collection environment does not meet the preset requirement, it is possible to refuse to collect the sound data this time and prompt the user to change the collection environment. After the user's operation of triggering the play of the speech section is received again, 201 is performed.

It should be appreciated that this step is a preferable step and not a requisite step. It is also possible to directly perform subsequent steps without performing 203.

At 204, the user is guided to follow and read the speech section.

The sound-collecting apparatus may guide the user to follow and read the speech section through a prompt tone; or guide the user to follow and read the speech section by displaying a prompt message or prompt picture on the device having a screen and connected to the sound-collecting apparatus.

For example, the smart speaker where the sound-collecting apparatus is located may guide the user to follow and read the speech section by issuing a "beep" prompt tone or a "please follow and read" prompt tone.

For another example, the smart collection apparatus may display a prompt tone or a prompt picture on the mobile phone to guide the user to follow and read the speech section.

In addition, while the user is guided to follow and read the speech section, the user may also be guided to get close to the sound pickup device to follow and read. For example, use the prompt tone "Please get close to the microphone to follow and read."

This step is also an optional step. It is possible not to guide the user to follow and read the speech section, but directly follow and read and perform step 205 after the user triggers the follow-read function. For example, after the user clicks the "Record" button in the interface shown in FIG. 3, enter the follow-read phase and begin to follow and read. Alternatively, automatically enter the follow-read phase and perform the step 205 after a preset period of time, for example, 2 seconds after the speech section is played.

At 205, the user's sound data of following and reading the speech section is collected.

This step is the processing of the follow-read phase. The user follows and reads the speech section just played during the follow-read phase, that is, the user himself repeats it once. The sound data collected at this time includes the user's voice data and the noise of the ambient environment.

After finishing following and reading the speech section, the user may click a preset physical button or a control on the interface to end the collection of the sound data of following and reading the speech section by the sound-collecting device. For example, the user may click the "End Recording" button on the interface to end the collection of the sound data of following and reading the speech section. For another example, the user may long press the "Record" button on the interface and perform following and reading during the long press, and on completion of the following and reading, loosen the button to trigger the sound-collecting apparatus to end the collection of the sound data of following and ending the speech section.

Or, upon failing to collect valid sound within a present time period (e.g., two seconds) after the user finishes following and reading, the sound-collecting apparatus automatically ends the collection of the sound data of following and reading the speech section.

At 206, the sound data of following and reading the speech section is subjected to interference removal processing using the sound interference coefficient to obtain second sound data.

In this step, noise suppression and reverberation adjustment may be performed on the sound data of following and reading by using the noise figure Xn and the reverberation delay coefficient Xd obtained in step 202. The existing noise suppression and reverberation adjustment methods may be specifically used, and will not be described in detail herein.

In addition, in addition to the interference removal processing such as noise suppression and reverberation adjustment mentioned in the embodiment of the present disclosure, other interference removal processing such as removal of breath sound, swallowing sound, and the like may be employed, and will not be described in detail herein.

At 207, training data for speech synthesis is obtained by using the second sound data.

In this step, the sound-collecting apparatus may upload the second sound data as training data for speech synthesis to the server. In order to reduce the waste of network bandwidth and waste of server resources by the poor-quality second sound data, the sound-collecting apparatus may first perform quality scoring on the second sound data, and when a quality scoring result satisfies a preset requirement, the sound-collecting apparatus uploads the second sound data to the server as the training data for speech synthesis, and the process turns to 201 of playing next preset speech section to continue to perform sound collection until a condition for ending the collection is satisfied. The condition for ending the collection may include, but is not limited to, completing the play of all the speech sections, or collecting a preset amount of second sound data.

When the quality scoring result does not meet the preset requirement, the second sound data collected at this time is rejected, and the process proceeds to 201 to play the same preset speech section to perform the sound collection again until collection of the second sound data for the speech section is completed, or the collection of the second sound data is still not yet completed when preset re-collecting times are reached (the quality scoring result of the second sound data collected consecutively for many times do not meet the preset requirement).

When quality scoring is performed for the second sound data, at least one of the following processes may be performed:

determining a degree of consistency between follow-read content in the second sound data and content of the played speech section;

determining whether the clarity of the second sound data meets a preset clarity requirement;

determining whether a speaking rate of the second sound data meets a preset speaking rate requirement.

Figure 5:
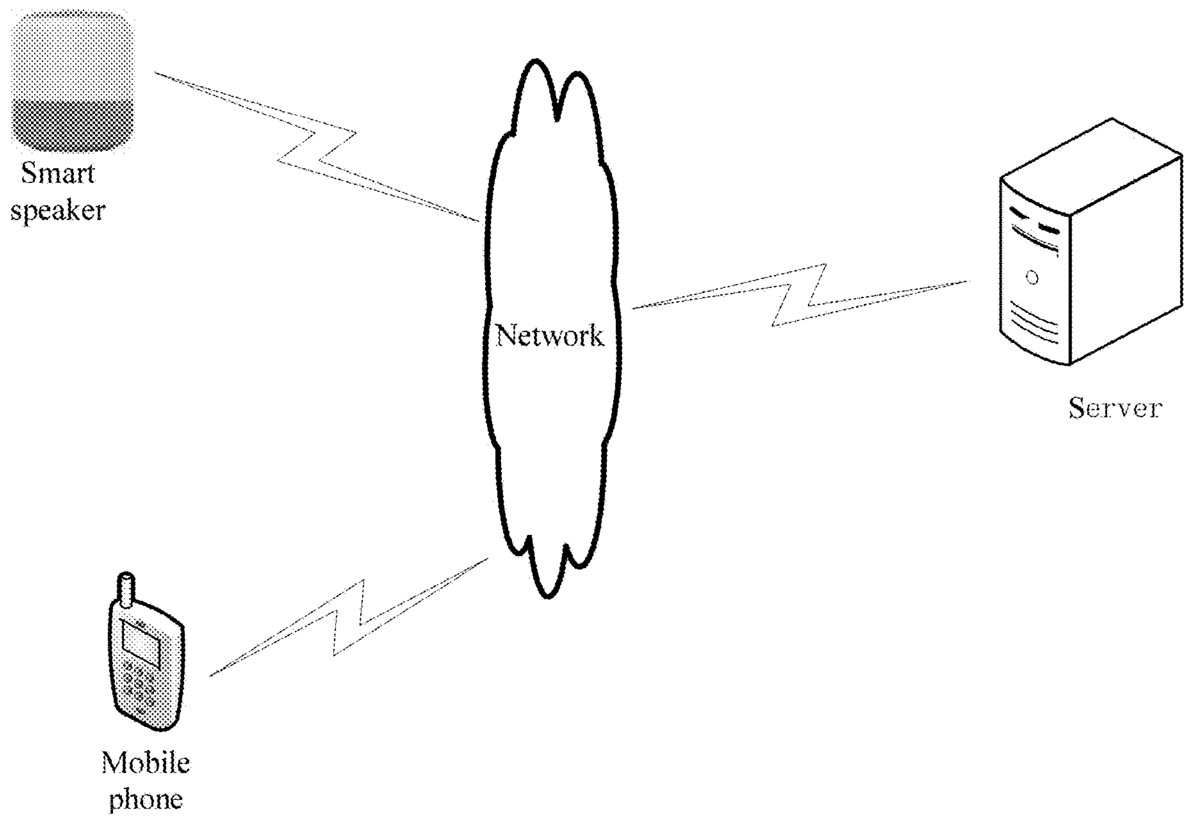
FIG. 5 is a schematic diagram of a scenario according to an embodiment of the present disclosure.

A specific application example is presented below:

As shown in FIG. 5, the smart speaker has a function of performing speech interaction with the user, and the user wants to set the speech of the smart speaker as his own voice. The user may use the mobile phone as a sound-collecting apparatus, for example, the user clicks an application that has a function of managing the smart speaker, and enters a speech configuration interface in the application. At this time, the sound collection function for speech synthesis of the smart speaker is activated, and the interface shown in FIG. 3 is displayed.

The user clicks the "Play" button on the interface to play the speech section "summer is going, and autumn is coming". The first sound data is collected while the mobile phone plays the speech section, and the interference coefficient is determined. If the interference coefficient meets the preset requirement, the message "Please click the record button to follow and read" is displayed on the interface. The user clicks the "Record" button on the interface to start following and reading the speech section. The content followed and read by the user is "summer is going, and autumn is coming." The mobile phone collects the second sound data, and uploads the second sound data collected this time to the server if the collected second sound data meets a quality requirement. The user continues to click the "Play" button to perform playing and following of next speech section. It should be appreciated that the mobile phone may also save all the collected second sound data that meet the quality requirement locally, and finally upload all the collected second sound data together to the server.

The server uses the respective second sound data uploaded by the mobile phone as the training data, performs model training, and associates the trained model with the smart speaker. When subsequent users perform speech interaction on the smart speaker, the smart speaker uses the model obtained by training to perform speech synthesis and plays the synthesized speech. The speech employs the user's own voice.

Another specific application example is presented below.

Figure 6:
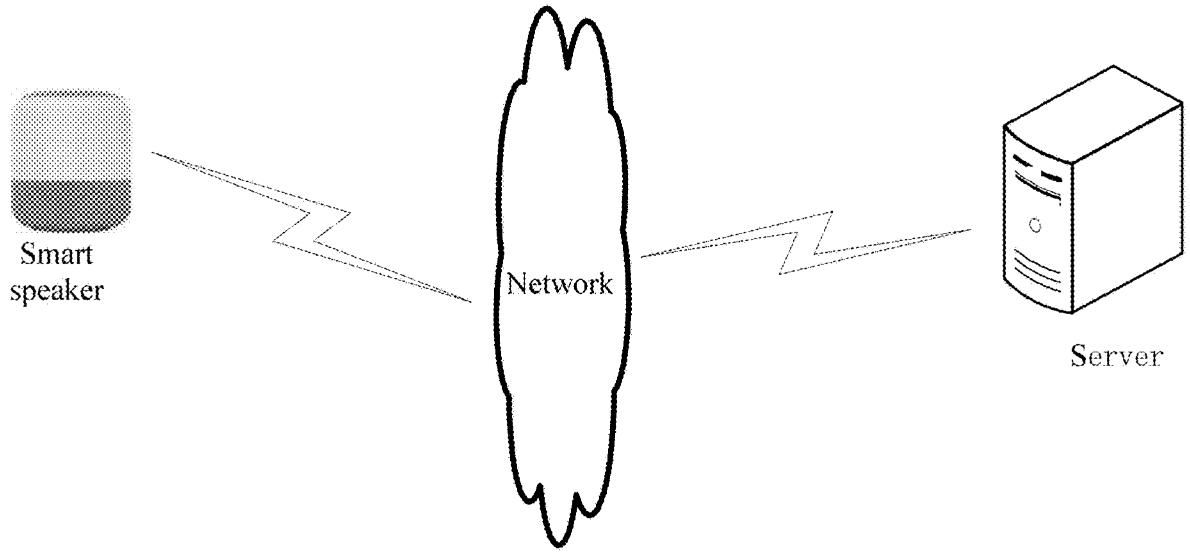
FIG. 6 is a schematic diagram of another scenario according to an embodiment of the present disclosure.

As shown in FIG. 6, the smart speaker has a function of performing speech interaction with the user, and the user wants to set the speech of the smart speaker as his own voice. The user sends a voice command "voice setting" to the smart speaker. The smart speaker activates the sound-collecting function, and plays the speech section "summer is going, and autumn is coming". The smart speaker collects the first sound data while playing the speech section, and determines the interference coefficient. If the interference coefficient satisfies the preset requirement, broadcast the prompt tone "please follow and read". The user starts to follow and read the content "summer is going, and autumn is coming". The smart speaker collects the second sound data, and uploads the second sound data collected this time to the server if the collected second sound data meets a quality requirement. Then, the smart speaker plays the next speech section to continue the sound collection.

The server uses respective second sound data uploaded by the smart speaker as the training data, performs model training, and associates the trained model with the smart speaker. When subsequent users perform speech interaction on the smart speaker, the smart speaker uses the model obtained by training to perform speech synthesis and plays the synthesized speech. The speech employs the user's own voice.

Figure 7:
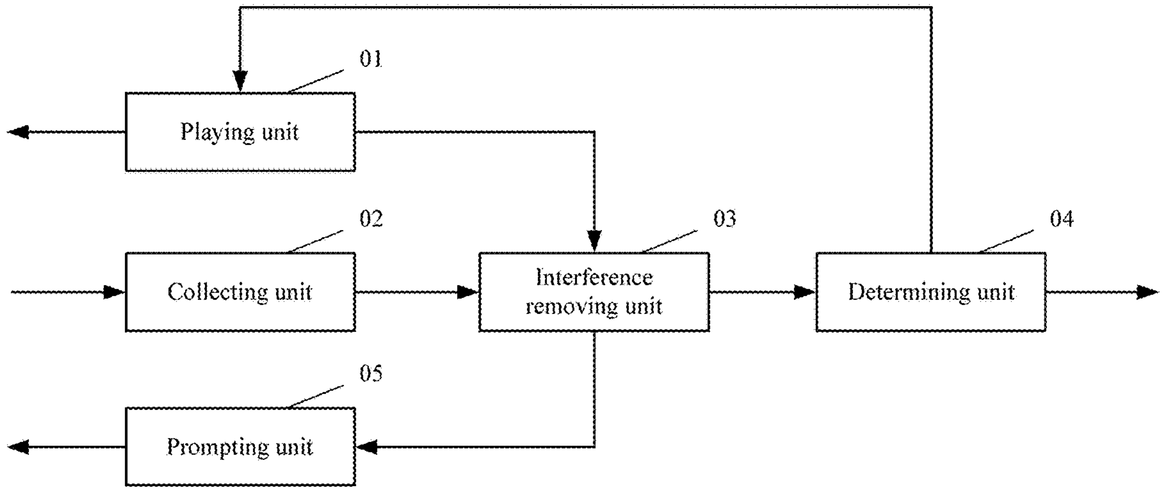
FIG. 7 is a structural diagram of a sound-collecting apparatus according to an embodiment of the present disclosure.

The apparatus provided by embodiments of the present disclosure is described in detail below. FIG. 7 is a structural diagram of a sound-collecting apparatus according to an embodiment of the present disclosure. As shown in FIG. 7, the apparatus may comprise: a playing unit 01, a collecting unit 02, an interference removing unit 03 and a determining unit 04, and may further comprise a prompting unit 05. The main functions of the units are as follows:

The playing unit 01 is configured to play a preset speech section.

After the sound collection function is activated, the playing unit 01 automatically plays the preset speech section, or after receiving the user's operation of triggering the play, the playing unit 01 plays the preset speech section. The played speech section is preferably a short sentence which is easy to memorize and read, so as to facilitate users at different ages and knowledge levels to follow and read.

In addition, when the playing unit 01 plays the speech section, words corresponding to the speech section may be displayed on a device having a screen and connected to the sound-collecting apparatus.

The collecting unit 02 is configured to collect the first sound data while playing the preset speech section; and collect sound data of the user following and reading the speech section.

The first sound data collected by the collecting unit 02 includes some noise of the ambient environment on the one hand, and a signal of the played speech section reflected back by the environment on the other hand.

The interference removing unit 03 is configured to determine the sound interference coefficient with the speech section and the first sound data; and perform interference removal processing on the sound data of following and reading the speech section with the sound interference coefficient, to obtain second sound data.

Specifically, upon determining the sound interference coefficient, the interference removing unit 03 may use the above-mentioned speech section as a reference speech, perform noise and reverberation estimation on the first sound data, and obtain a noise figure Xn and a reverberation delay coefficient Xd of the first sound data.

Upon performing the interference removal processing on the follow-read sound data with the sound interference coefficient, the interference removing unit 03 may use the noise figure and the reverberation delay coefficient obtained above to perform noise suppression and reverberation adjustment on the follow-read sound data.

The determining unit 04 is configured to obtain training data for speech synthesis by using the second sound data.

Furthermore, the prompting unit 05 is configured to guide the user to follow and read the speech section through a prompt tone before the collecting unit 02 collects the sound data of the user following and reading the speech section; or guide the user to follow and read the speech section by displaying a prompt message or prompt picture on a device having a screen and connected to the sound-collecting apparatus.

Furthermore, before guiding the user to follow and read the speech section, the prompting unit 05 is further configured to use the sound interference coefficient to judge whether the current collection environment meets a preset requirement, and if yes, continue to guide the user to follow and read the speech section; otherwise, prompt the user to change the collection environment.

For example, the prompting unit 05 may judge whether the noise figure Xn is less than a preset noise figure threshold and whether the reverberation delay coefficient Xd is less than a preset reverberation delay coefficient threshold, and if yes, determine that the current collection environment meets the preset requirement; otherwise, determine the current collection environment does not meet the preset requirement.

Specifically, the determining unit 04 may upload the second sound data to the server as training data for speech synthesis; or perform quality scoring on the second sound data, and when a quality scoring result satisfies a preset requirement, upload the second sound data to the server as training data for speech synthesis.

When the quality scoring result of the second sound data does not meet the preset requirement, the playing unit 01 plays the same preset speech section to perform sound collection again; when the quality scoring result of the second sound data satisfies the preset requirement, the playing unit 01 plays next preset speech section to continue to perform the sound collection.

Figure 8:
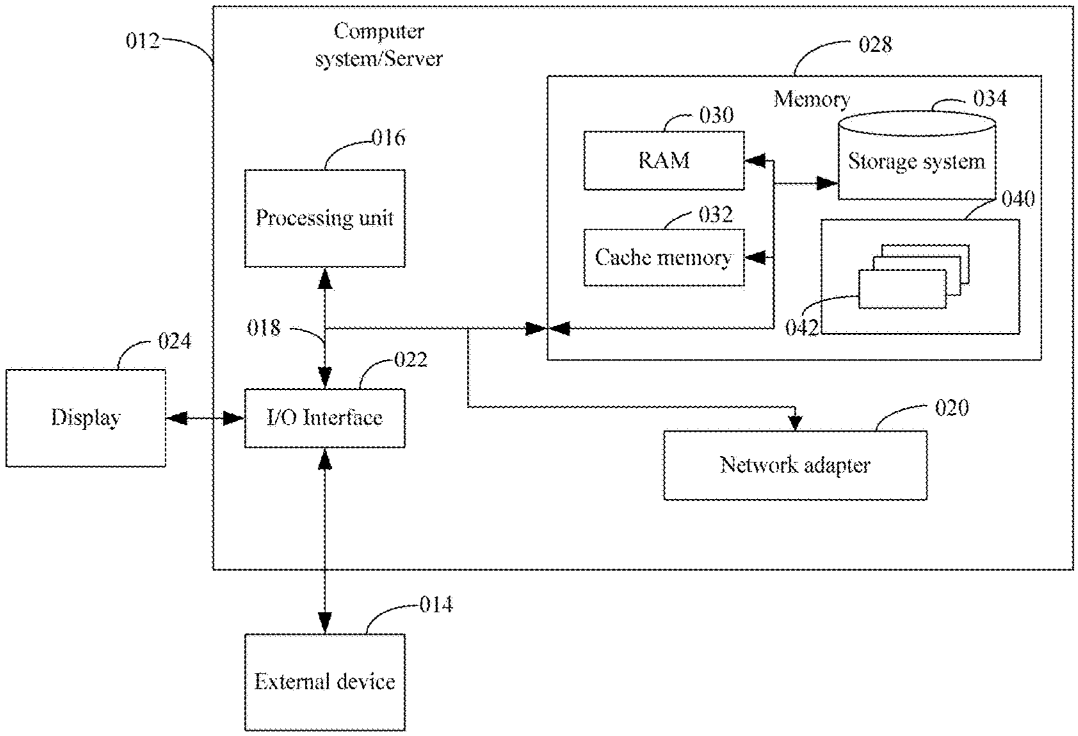
FIG. 8 illustrates a block diagram of an exemplary computer system adapted to implement embodiments of the present disclosure.

FIG. 8 illustrates a block diagram of an example computer system adapted to implement an implementation mode of the present disclosure. The computer system shown in FIG. 8 is only an example and should not bring about any limitation to the function and scope of use of the embodiments of the present disclosure.

As shown in FIG. 8, the computer system is shown in the form of a general-purpose computing device. The components of the computer system may include, but are not limited to, one or more processors or processing units 016, a memory 028, and a bus 018 that couples various system components including system memory 028 and the processor 016.

The bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PC) bus.

Computer system typically includes a variety of computer system readable media. Such media may be any available media that is accessible by computer system, and it includes both volatile and non-volatile media, removable and non-removable media.

Memory 028 can include computer system readable media in the form of volatile memory, such as random access memory (RAM) 030 and/or cache memory 032. Computer system may further include other removable non-removable, volatile/non-volatile computer system storage media. By way of example only, storage system 034 can be provided for reading from and writing to a non-removable, non-volatile magnetic media (not shown in FIG. 8 and typically called a "hard drive"). Although not shown in FIG. 8, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Programmability 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system may also communicate with one or more external devices 014 such as a keyboard, a pointing device, a display 024, etc.; with one or more devices that enable a user to interact with computer system; and/or with any devices (e.g., network card, modem, etc.) that enable computer system to communicate with one or more other computing devices. Such communication can occur via Input/Output (110) interfaces 022. Still yet, computer system can communicate with one or more networks such as a local area network (LAN), a general wide area network (WAN), and/or a public network (e.g., the Internet) via network adapter 020. As depicted in FIG. 8, network adapter 020 communicates with the other communication modules of computer system via bus 018. It should be understood that although not shown, other hardware and/or software modules could be used in conjunction with computer system. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the steps of the method according to embodiments of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the one or more processors perform the steps of the method according to embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As can be seen from the above depictions, the method, apparatus, device and computer storage medium according to the present disclosure have the following advantages:

1) The present disclosure realizes the collection of sound data in a way that the speech section is played and then the user follows and reads the speech section, and is also applicable for a user having a reading difficulty such as illiteracy.

2) In the follow-read mode, the user may employ and is inclined to employ the rhythm, emotion and speed mode of the speech section, which is beneficial to control emotional prosody features that are difficult to describe in the language during the sound collection process, and is more conducive to subsequent training of a speech synthesis model.

3) Since the user does not need to gaze at the screen, the user may get closer to the sound pickup device during recording, so that even if there is no sound-gathering device, higher-quality sound data can be collected, and the requirement for collecting the sound data for speech syntheses can be satisfied easier.

4) In the manner provided by the present disclosure, the recording environment can be effectively perceived, and the perceived environment information can be used to determine the interference coefficient, thereby performing interference removal processing for the collected user's sound data, and thereby improving the quality of the collected sound data.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A sound-collecting method, wherein the method comprises:

a sound-collecting apparatus collecting first sound data while playing a preset speech section;

collecting sound data of a user following and reading the preset speech section;

subjecting the sound data of following and reading the preset speech section to interference removal processing by using a sound interference coefficient to obtain second sound data, wherein the sound interference coefficient is determined with the preset speech section and the first sound data;

obtaining training data for speech synthesis by using the second sound data.

2. The method according to claim 1, wherein the sound-collecting apparatus playing a preset speech section comprises:

after a sound collection function is activated, the sound-collecting apparatus automatically plays the preset speech section; or after the sound collection function is activated, the sound-collecting apparatus playing the preset speech section when the user's operation of triggering the play is received.

3. The method according to claim 1, wherein while the sound-collecting apparatus playing the preset speech section, the method further comprises:

displaying words corresponding to the preset speech section on a device having a screen and connected to the sound-collecting apparatus.

4. The method according to claim 1, wherein before the collecting the sound data of the user following and reading the preset speech section, the method further comprises:

the sound-collecting apparatus guiding the user to follow and read the preset speech section through a prompt tone; or guiding the user to follow and read the preset speech section by displaying a prompt message or prompt picture on the device having a screen and connected to the sound-collecting apparatus.

5. The method according to claim 4, wherein before guiding the user to follow and read the preset speech section, the method further comprises:

using the sound interference coefficient to judge whether a current collection environment meets a preset requirement, and if yes, continuing to guide the user to follow and read the preset speech section; otherwise, prompting the user to change the collection environment.

6. The method according to claim 1, wherein the determining the sound interference coefficient with the preset speech section and the first sound data comprises:

taking the preset speech section as a reference speech, performing noise and reverberation estimation on the first sound data, and obtaining a noise figure and a reverberation delay coefficient of the first sound data;

the subjecting the sound data of following and reading the preset speech section to interference removal processing by using a sound interference coefficient comprises:

using the noise figure and the reverberation delay coefficient to perform noise suppression and reverberation adjustment on the sound data of following and reading the preset speech section.

7. The method according to claim 1, wherein the obtaining training data for speech synthesis by using the second sound data comprises:

the sound-collecting apparatus uploading the second sound data to a server as training data for speech synthesis; or the sound-collecting apparatus performing quality scoring on the second sound data, and when a quality scoring result satisfies a preset requirement, uploading the second sound data to the server as training data for speech synthesis.

8. The method according to claim 7, wherein when the quality scoring result of the second sound data does not meet the preset requirement, playing the same preset speech section to perform sound collection again; when the quality scoring result of the second sound data satisfies the preset requirement, playing next preset speech section to continue to perform the sound collection.

9. A device, wherein the device comprises:

one or more processors, a storage for storing one or more programs, the one or more programs, when executed by said one or more processors, enable said one or more processors to implement a sound-collecting method, wherein the method comprises:

a sound-collecting apparatus collecting first sound data while playing a preset speech section;

collecting sound data of a user following and reading the preset speech section;

subjecting the sound data of following and reading the preset speech section to interference removal processing by using a sound interference coefficient to obtain second sound data, wherein the sound interference coefficient is determined with the preset speech section and the first sound data;

obtaining training data for speech synthesis by using the second sound data.

10. A storage medium containing computer executable instructions which, when executed by a computer processor, perform a sound-collecting method, wherein the method comprises:

a sound-collecting apparatus collecting first sound data while playing a preset speech section;

collecting sound data of a user following and reading the preset speech section;

subjecting the sound data of following and reading the preset speech section to interference removal processing by using a sound interference coefficient to obtain second sound data, wherein the sound interference coefficient is determined with the preset speech section and the first sound data;

obtaining training data for speech synthesis by using the second sound data.

* * * * *